Patented Jan. 1, 1929.

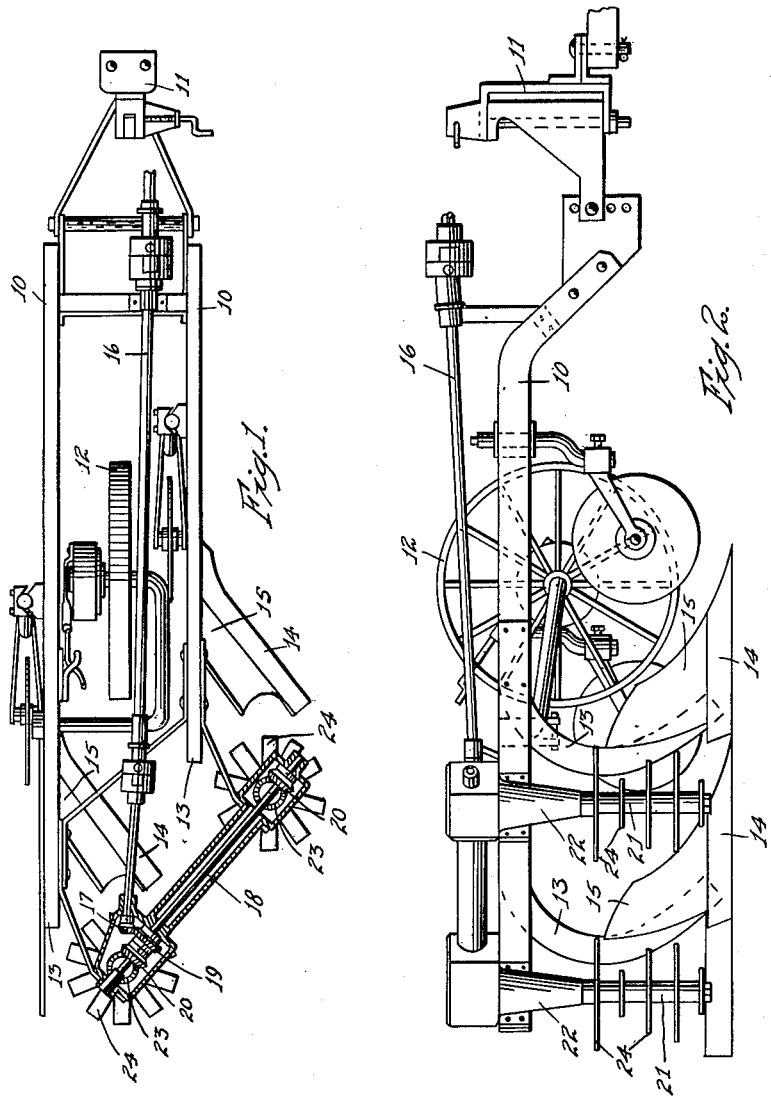

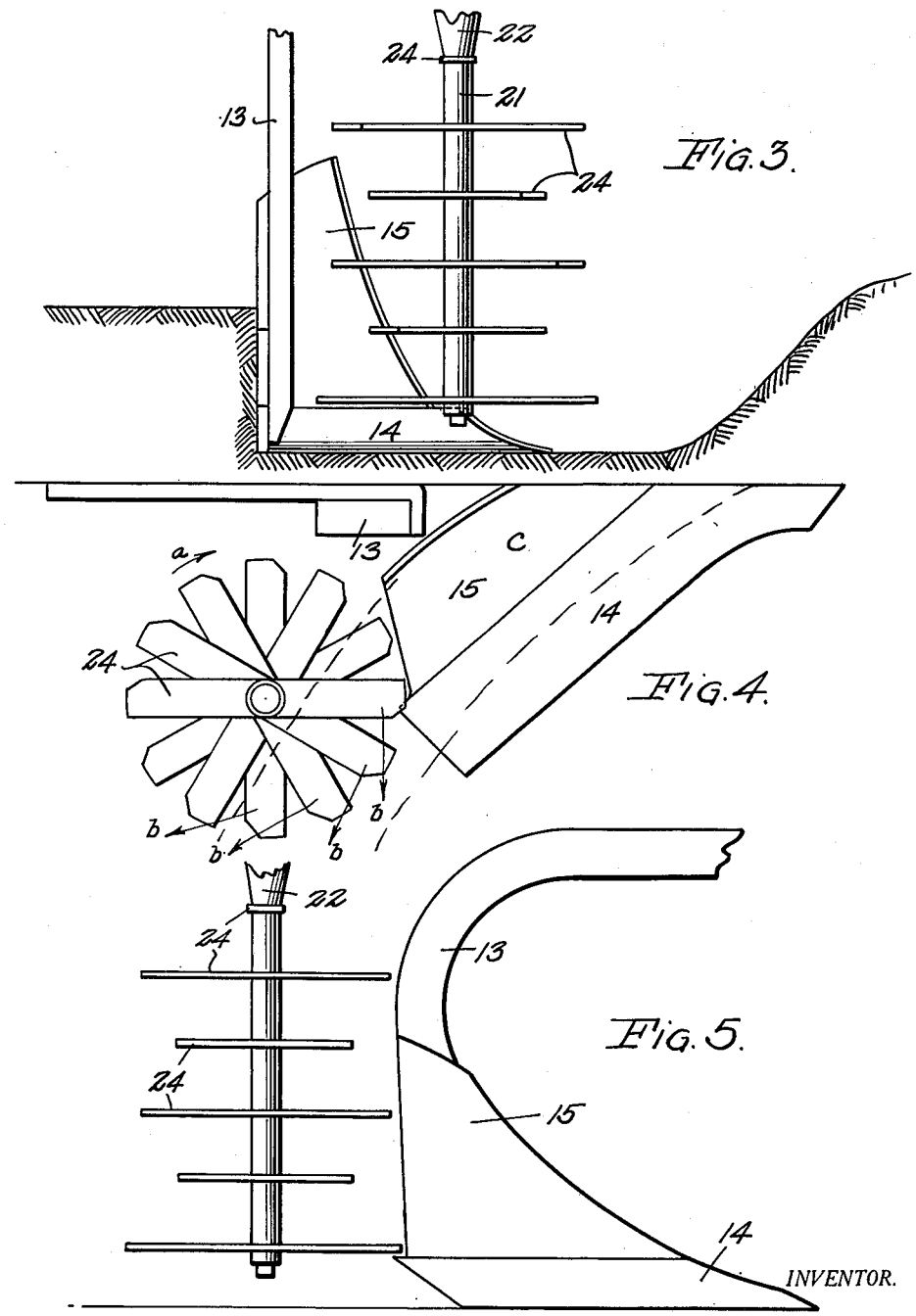

1,697,679

UNITED STATES PATENT OFFICE

JAY BROWNLEE DAVIDSON, OF AMES, IOWA, ASSIGNOR, BY MESNE ASSIGNMENTS, TO GENERAL IMPLEMENT COMPANY, A CORPORATION OF DELAWARE.

COMBINED PLOW AND SOIL PULVERIZER.

Application filed November 15, 1927. Serial No. 233,385.

My invention relates to that class of combined plows and soil pulverizers which are designed to be advanced by means of a tractor, and in which power to operate the soil pulverizer is transmitted from the tractor engine, and in which class of implements there is usually employed a plow to be advanced by the tractor and to cause the furrow slice to flow from the plow moldboard relatively outwardly and rearwardly, and a series of pulverizer blades to engage said furrow slice and purverize or break up the particles thereof.

The object of my invention is to provide an implement of this character of simple, durable and inexpensive construction, with the parts thereof so arranged and combined relative to each other that the action of the pulverizer blades upon the furrow slice tends to propel the plow forwardly through the soil, thus reducing the amount of tractive power necessary for advancing the implement.

A further object is to provide an apparatus of this character in which the pulverizing blades co-operate with the plow moldboard in such manner as to lessen the amount of friction of the furrow slice upon the plow moldboard as compared with ordinary plows, for the double purpose of lessening the amount of tractive force required to advance the implement and for causing the moldboard to scour readily under adverse conditions.

My invention consists in the construction of the plow moldboard and in the construction of the pulverizers, and particularly in the relative arrangement and combination of the pulverizer and plow moldboard, whereby the objects contemplated are attained, as hereinafter more fully set forth, pointed out in my claims, and illustrated in the accompanying drawings, in which:

Figure 1 shows a top or plan view of a combined plow and pulverizer implement embodying my invention.

Figure 2 shows a side elevation of the same.

Figure 3 shows an enlarged detail view of a rear elevation of a plow and pulverizer embodying my invention and illustrating the construction of the plow and the relative arrangement thereto of the pulverizer; and Figure 4 shows a top or plan view of same.

Figure 5 shows a side elevation of same.

Referring to the accompanying drawings, I have used the reference numeral 10 to indicate generally the frame of the implement. At its forward end there is a coupling device 11 for attaching the implement to a tractor or the like. A supporting wheel 12 is applied to the frame for holding its rear end at the proper elevation. Fixed to the frame are two plow beams 13. A plow is fixed to each beam. The plow comprises a plow share 14 of the ordinary construction and a moldboard 15 connected therewith, which moldboard is relatively narrow from its front or cutting edge to its rear edge. In an ordinary plow the function of the moldboard is to elevate one edge of the furrow slice and cause it to turn over so it will be thrown into the furrow in a position with the under surface of the furrow slice uppermost. With my improvement, the length of the moldboard is such that it of itself would not complete the turning-over movement of the furrow slice, but would only elevate it so that it stood in a substantially upright position, and if the pulverizer, hereinafter described, were omitted, the furrow slice would wholly or partially fall back again into the furrow without being turned over.

Mounted upon the frame 10 is a drive shaft 16, its forward end being designed for operative engagement with the engine of a tractor, and its rear end being provided with a beveled pinion 17. Fixed to the frame 10 is a shaft 18 having a beveled pinion 19 in mesh with the pinion 17, and also having a beveled pinion 20 near each end. A pulverizer shaft 21 is arranged in a substantially upright position and mounted for rotation in a bearing 22, and this shaft 21 has at its upper end a beveled pinion 23 in mesh with the pinion 20. Mounted upon the shaft 21 is a series of pulverizer blades 24 in a substantially horizontal position and spaced apart from each other. These blades are preferably arranged upon the shaft 22 in the manner shown in Figure 4, with the outer ends of the blades, as viewed from the top, spaced apart substantially equidistant from each other. The advantage of this arrangement is that the impact of the blades upon the furrow slice will be equally distributed throughout the entire rotation of the pulverizers, thus minimizing the vibration to the frame, which might otherwise occur, thereby reducing shock or vibration or back lash on the driving members such as gears, universal joints, and so forth.

One of the important features of my invention is the relative arrangement and combination of the pulverizer and the plow, and, as will be seen in the drawings, the shaft 21 of the pulverizer is arranged in a substantially upright position between a fore and aft line drawn through the outer end of the plow share and a fore and aft line drawn through the land side of the plow. Furthermore, it will be seen from the drawings that the pulverizer is located wholly in the rear of the plow moldboard. In operation the pulverizer blades are rotated in the direction shown by the arrow "a" in Figure 4.

By having the moldboard made relatively short from front to rear, and by positioning the rotary blades spaced apart from the rear end of the moldboard, and with the shaft of the pulverizer blades arranged between a fore and aft line through the outer edge of the plow share and a fore and aft line drawn through the land side of the plow, the following advantageous results are attained:

As the implement is being advanced through the soil, as in practical use, a furrow slice is cut loose by the plow share, and its edge adjacent to the land side of the plow is elevated, and the lateral inclination of the moldboard toward its rear end causes this furrow slice to be given a direction of movement rearwardly and outwardly relative to the moldboard. In Figure 4 of the drawings, I have, by dotted lines, indicated the position of the upper edge of the furrow slice as it passes from the moldboard. Shortly after the furrow slice passes beyond the rear edge of the moldboard, it is engaged by the pulverizer blades and these pulverizer blades, moving in the direction of the arrow "a", complete the turning-over movement of the furrow slice. In this respect, the pulverizer blades perform part of the function ordinarily performed by the plow moldboard. With my improvement, the relatively short plow moldboard only serves to start the turning-over movement of the furrow slice, and the pulverizer blades complete this turning-over movement. In this connection it is to be understood that with an ordinary plow, a considerable portion of draft power required to advance the plow through the soil is occasioned by the friction of the furrow slice as it passes over the rear end of the moldboard, and its movement of turning over is effected by this frictional engagement with the rear end of the moldboard. With my improvement, a considerable amount of the power necessary to advance the plow is saved because the moldboard proper does only a certain portion of the turning movement of the furrow slice.

By having the shaft of the pulverizer located between a fore and aft line drawn through the outer edge of the plow share and a fore and aft line through the land side of the plow, I accomplish the following highly desirable results:

When the pulverizer blades strike upon the furrow slice before it has completed its turning-over movement, the blades will strike and engage the furrow slice in the direction shown by the arrows "b" as applied to those blades which are in actual contact with the furrow slice. The outlines of the furrow slice flow are shown by dotted lines "c" in Figure 4, and show that the furrow slice moves rearwardly and outwardly relative to the plow, and the arrows "b" shown in Figure 4 illustrate the fact that the lines of force applied by the pulverizer blades to the several parts of the furrow slice are always in a direction rearwardly and outwardly relative to what may be called the stream line of the furrow slice, indicated by dotted lines "c". The result of this relative arrangement and position of the pulverizer blades to the furrow slice is that, while the particles of soil are driven outwardly and downwardly from the implement, the ends of the pulverizer blades which are in engagement with the soil are pushing it, to some extent, rearwardly, and this tends to advance the implement.

I have carefully tested my improved implement under widely varying conditions of soil, and have made comparative tests with my improved implement, and a plow of ordinary shape, having the same width of cut. In these comparative tests I have demonstrated that a tractor will draw my improved implement, and not only turn over the furrow slice, but thoroughly pulverize the soil with approximately the same amount of expended engine energy as is required to draw an ordinary plow of the same furrow width, and which performs only a turning-over movement of the stream of soil. I have demonstrated that the reasons for this advantageous result are, first, that with my improved moldboard the amount of friction between the moldboard and the furrow slice is greatly reduced, and that a great deal less applied power is necessary to complete the turning-over movement of the soil by means of my improved pulverizer than would be required if the plow moldboard were made of such size and shape as to of itself complete this turning-over movement; and second, by causing the pulverizer blades to strike upon the under surface of the furrow slice and tend to move the particles thereof rearwardly and outwardly, the pulverizer shaft has applied to it a pressure tending to move it forwardly relative to the furrow slice.

In an ordinary plow the moldboard element, in order to perform its function of completely turning over the furrow slice, is made so that its rearmost end projects rearwardly beyond the rearmost point of the plow share. With my improvement I find it advantageous to terminate the rearmost end of the moldboard at a point in front of the rearmost end of the plow share, as clearly shown in the drawings.

In practice I preferably drive the pulverizer blades at a speed of about 500 revolutions a minute, and I have found in practice that this is sufficient to thoroughly pulverize the soil and to complete its turning-over movement and to throw it upon the land at the side of the furrow in such manner as to effectively bury or cover all stalks, sod or trash ordinarily found on the top surface of a field being plowed.

With my improvement the plow element and the pulverizer element are caused to cooperate, first in reducing the amount of friction between the plow share and the furrow slice; second the moldboard performs the initial part only of the turning-over movement of the furrow slice and the pulverizer completes this turning-over movement; and third the impact of the pulverizer blades upon the furrow slice in a rearward and outward direction relative to the stream line of the furrow slice tends to impart a relative forward movement to the implement. The plow element presents the furrow slice to the action of the pulverizer blades in such position that the soil is pulverized with a minimum of applied power.

In the specification I have for convenience defined the furrow slice, being turned over by the implement, as moving rearwardly relative to the moldboard. In practice, of course, it is the moldboard which moves forwardly relative to the soil, and hence where I have employed this expression I refer to the rearward movement of the furrow slice in the sense of it being relative to that of the movement of the moldboard.

In the claims I have employed the term lifting member as applied to the part referred to herein as a moldboard, for the reason that the main function of said member is its lifting function as distinguished from its turning over function.

While I have shown and described the plow share as a preferred form I do not wish to be limited to such construction, as any means for forming a furrow slice employed in association with the lifting member, I consider as falling within the purview of my invention.

I claim as my invention:

1. In an implement of the class described, the combination of a plow share, a lifting member associated with the plow share, said lifting member being shaped to perform only the initial part of a turning-over movement of the furrow slice, a substantially upright shaft, means for rotating the shaft, a series of blades fixed to the shaft and arranged in substantially horizontal positions, the position and location of the shaft and its blades relative to the share and lifting member being such that the entire path of travel of the blades is confined to the area on that side of the landside of the plow towards which the plow share is extended, and also such that as the furrow slice passes beyond the lifting member the blades will cooperate with the lifting member in completing the turning-over movement of the furrow slice and also in pulverizing the entire furrow slice from a point adjacent the lower edge of the furrow slice to the upper portion thereof, said shaft being positioned between a fore and aft line through the lower rear end of the plow share and the land-side of the implement.

2. In an implement of the class described, the combination of a plow share a lifting member associated with the plow share, said lifting member being shaped to perform only the initial part of a turning-over movement of the furrow slice, a substantially upright shaft, means for rotating the shaft, a series of blades fixed to the shaft and arranged in substantially horizontal positions, the position and location of the shaft and its blades relative to the share and lifting member being such that the entire path of travel of the blades is confined to the area on that side of the land-side of the plow towards which the plow share is extended, and also such that as the furrow slice passes beyond the lifting member the blades will cooperate with the lifting member in completing the turning-over movement of the furrow slice and also in pulverizing the entire furrow slice from a point adjacent the lower edge of the furrow slice to the upper portion thereof, and said blades being also so positioned that during their movement through a furrow slice they will strike upon the furrow slice in such direction as to impart a movement to it rearwardly and outwardly relative to the stream line of the furrow slice to thereby aid in imparting a forward movement to the implement.

Des Moines, Iowa, November 8, 1927.

JAY BROWNLEE DAVIDSON.